(12) United States Patent
Imai

(10) Patent No.: US 10,705,418 B2
(45) Date of Patent: Jul. 7, 2020

(54) PROJECTOR AND METHOD FOR CONTROLLING PROJECTOR

(71) Applicant: SEIKO EPSON CORPORATION, Tokyo (JP)

(72) Inventor: Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/170,772

(22) Filed: Oct. 25, 2018

(65) Prior Publication Data

US 2019/0129293 A1 May 2, 2019

(30) Foreign Application Priority Data

Oct. 26, 2017 (JP) .................. 2017-206812

(51) Int. Cl.
*G03B 21/20* (2006.01)

(52) U.S. Cl.
CPC ..... *G03B 21/2053* (2013.01); *G03B 21/2086* (2013.01)

(58) Field of Classification Search
CPC ........ G02B 13/16; G02B 15/06; G02B 15/10; H04N 9/31–3197; G03B 21/00–64; G03B 21/145
See application file for complete search history.

(56) References Cited

U.S. PATENT DOCUMENTS

| 2004/0196442 A1* | 10/2004 | D'Alessio | G03B 21/145 353/85 |
| 2006/0028622 A1* | 2/2006 | Nojima | G03B 21/10 353/75 |
| 2008/0297741 A1* | 12/2008 | Matsuda | G02B 13/16 353/101 |
| 2012/0218528 A1* | 8/2012 | Kano | G03B 21/142 353/101 |
| 2016/0073072 A1* | 3/2016 | Tanaka | G09G 3/002 353/31 |

FOREIGN PATENT DOCUMENTS

| JP | 2006-119460 A | 5/2006 |
| JP | 2010-32932 A | 2/2010 |
| JP | 2011-203622 A | 10/2011 |

* cited by examiner

*Primary Examiner* — Cara E Rakowski
*Assistant Examiner* — Christopher A Lamb, II
(74) *Attorney, Agent, or Firm* — Oliff PLC

(57) ABSTRACT

A projector includes a projection section that projects first light representing an image on a projection surface, a detection section that detects whether or not an enclosure member that encloses part of an area through which the first light projected via the projection section passes has been attached to the projector, and an adjustment section that adjusts the intensity of the first light based on the result of the detection performed by the detection section.

8 Claims, 3 Drawing Sheets

PROJECTOR AND METHOD FOR CONTROLLING PROJECTOR

CROSS-REFERENCE

The entire disclosure of Japanese Patent Application No. 2017-206812, filed Oct. 26, 2017 is expressly incorporated by reference herein.

BACKGROUND

1. Technical Field

The present invention relates to a projector and a method for controlling the projector.

2. Related Art

There is a known projector capable of projecting high-luminance projection light, and JP-A-2010-32932 describes a projector including a light blocking member that prevents the projection light from entering a user's eyes in a specific position, moreover, prevents the projection light from affecting a human body.

It is conceivable to configure a member that prevents the projection light from affecting a human body, such as the light blocking member described in JP-A-2010-32932, to be attachable to and detachable from the projector.

However, for example, in a case where the member unintendedly comes off the projector, for example, when the projector is accidentally caused to collide with a wall or any other object, the projection light could affect a human body.

SUMMARY

An advantage of some aspects of the invention is to provide a technology for preventing the projection light from affecting a human body even when a member that prevents projection light from affecting a human body has not been attached to a projector.

A projector according to an aspect of the invention is a projector including a projection section that projects first light representing an image on a projection surface, a detection section that detects whether or not an enclosure member that encloses part of an area through which the first light projected via the projection section passes has been attached to the projector, and an adjustment section that adjusts intensity of the first light based on a result of the detection performed by the detection section.

The intensity of the first light that reaches a user decreases with distance from the projection section. In the case where the enclosure member has been attached to the projector, the presence of the enclosure member restricts the distance from the user to the projection section. On the other hand, in a case where the enclosure member comes off the projector, the user can be closer to the projection section than in the case where the enclosure member has been attached to the projector, so that the user is likely to be affected by the first light.

According to the aspect described above, the intensity of the first light is adjusted based on whether or not the enclosure member has been attached to the projector. Therefore, for example, in the case where the enclosure member has not been attached to the projector, the intensity of the first light can be lowered, whereby the user is unlikely to be affected by the first light.

It is desirable that the projector according to the aspect described above further includes a light source that emits second light and a light modulating section that modulates the second light in accordance with image information to produce the first light, and that the adjustment section adjusts a maximum of intensity of the second light based on the result of the detection performed by the detection section to adjust the intensity of the first light.

According to the aspect described above, for example, controlling the light source to adjust the maximum of the intensity of the second light allows adjustment of the intensity of the first light.

In the projector according to the aspect described above, it is desirable that the projection section is a projection lens, that the projector further includes a determination section that determines a type of the projection lens, and that the adjustment section adjusts the maximum in the case where the enclosure member has not been attached based on a result of the determination performed by the determination section.

According to the aspect described above, for example, when the projection lens is exchanged, the intensity of the first light can be adjusted in accordance with the projection lens after the exchange.

In the projector according to the aspect described above, it is desirable that in the situation in which the enclosure member has not been attached, and in a case where the projection lens is a second lens having optical transmittance lower than optical transmittance of a first lens, the adjustment section adjusts the maximum to a value greater than the maximum in a case where the projection lens is the first lens.

According to the aspect described above, a change in the intensity of the first light resulting from a difference in the optical transmittance of the projection lens can be compensated by adjustment of the maximum of the intensity of the second light.

In the projector according to the aspect described above, it is desirable that in a case where the optical transmittance of the projection lens is smaller than a first threshold, the adjustment section makes adjustment in which the maximum in the case where the enclosure member has not been attached is made equal to the maximum in the case where the enclosure member has been attached.

In the situation in which the optical transmittance of the projection lens is smaller than the first threshold, the maximum of the intensity of the first light is restricted by the projection lens. Therefore, in this situation, the user is unlikely to be affected by the first light even in the case where the enclosure member has not been attached to the projector.

According to the aspect described above, in the case where the optical transmittance of the projection lens is smaller than the first threshold, the user is unlikely to be affected by the first light by making the easy adjustment in which the maximum of the intensity of the second light in the case where the enclosure member has not been attached is made equal to the maximum of the intensity of the second light in the case where the enclosure member has been attached.

In the projector according to the aspect described above, it is desirable that the projector further includes an acceptance section that accepts operation of setting luminance of the image, and that the adjustment section adjusts the maximum based on the operation accepted by the acceptance section.

According to the aspect described above, for example, the luminance of the image can be adjusted in accordance with the user's preference.

In the projector according to the aspect described above, it is desirable that in a case where the luminance set by the operation is smaller than a second threshold, the adjustment section makes adjustment in which the maximum in the case where the enclosure member has not been attached is made equal to the maximum in the case where the enclosure member has been attached.

In the situation in which the luminance set by the operation is smaller than the second threshold, the maximum of the intensity of the first light is restricted by the set luminance. Therefore, in this situation, the user is unlikely to be affected by the first light even in the case where the enclosure member has not been attached to the projector.

According to the aspect described above, in the case where the luminance set by the operation is smaller than the second threshold, the user is unlikely to be affected by the first light by making the easy adjustment in which the maximum of intensity of the second light in the case where the enclosure member has not been attached is made equal to the maximum of the intensity of the second light in the case where the enclosure member has been attached.

A method for controlling the action of a projector according to another aspect of the invention is a method for controlling a projector that projects first light representing an image on a projection surface, the method including detecting whether or not an enclosure member that encloses part of an area through which the first light projected from the projector passes has been attached to the projector and adjusting intensity of the first light based on a result of the detection.

According to the aspect described above, the intensity of the first light is lowered, for example, when the enclosure member comes off the projector, whereby the user is unlikely to be affected by the first light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
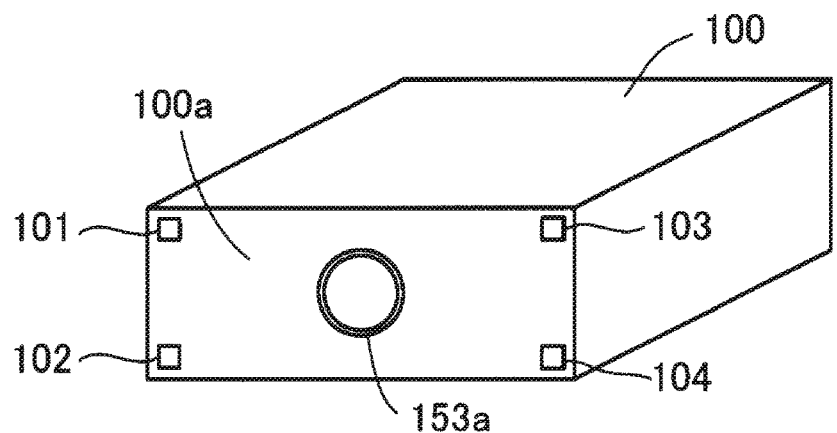
FIG. 1 shows a projector according to a first embodiment.

Embodiments according to the invention will be described below with reference to the drawings. In the drawings, the dimension and scale of each portion differ from actual values as appropriate. Further, the embodiments described below are preferable specific examples of the invention. A variety of technically preferable restrictions are therefore imposed on the embodiments. The scope of the invention is, however, not limited to any of the restricted forms unless the following description particularly stats that the restriction is imposed on the invention.

First Embodiment

FIG. 1 shows a projector 100 according to a first embodiment.

An overview of the projector 100 will first be described.

The projector 100 includes a projection lens 153a. The projection lens 153a projects first light representing an image (hereinafter also referred to as "image light") on a projection surface 300 (see FIG. 4). The projection lens 153a is an example of a projection section that projects the image light on the projection surface 300. The projection surface 300 is, for example, a screen, a wall, or the outer surface of an object on which the image light is projected, such as a merchandise.

The projector 100 allows an enclosure member 200 (see FIG. 3) to be attached thereto. When the enclosure member 200 is attached to the projector 100, the presence of the enclosure member 200 makes it difficult for a user of the projector 100 to access the projection lens 153a.

The intensity of the image light is maximized immediately after projected via the projection lens 153a and decreases with distance from the projection lens 153a. Therefore, attaching the enclosure member 200 to the projector 100 can make it difficult for the user to access the projection lens 153a and can prevent the high-intensity image light from entering the user's eyes.

For example, in a country or a region where exposure of blue light having power (intensity) higher than or equal to a certain value to a person is restricted, attaching the enclosure member 200 to the projector 100 is effective in satisfying the restriction.

The projector 100 is provided with recesses 101 to 104, which allows attachment of the enclosure member 200, and the recesses 101 to 104 are specifically provided in a surface 100a, where the projection lens 153a is provided. The number of recesses is not limited to four and can be changed as appropriate.

Figure 2:
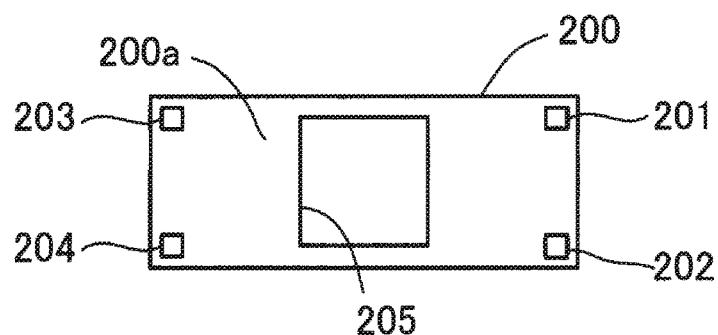
FIG. 2 shows an enclosure member and a surface thereof that faces a surface of the projector.

FIG. 2 shows a surface 200a of the enclosure member 200, and the surface 200a faces the surface 100a of the projector 100 when the enclosure member 200 is attached to the projector 100.

The surface 200a is provided with a protrusion 201, which fits into the recess 101, a protrusion 202, which fits into the recess 102, a protrusion 203, which fits into the recess 103, and a protrusion 204, which fits into the recess 104. The number of protrusions is desirably greater than or equal to one but smaller than or equal to the number of recesses. Conversely, the surface 100a may be provided with the protrusions, and the surface 200a may be provided with the recesses.

Figure 3:
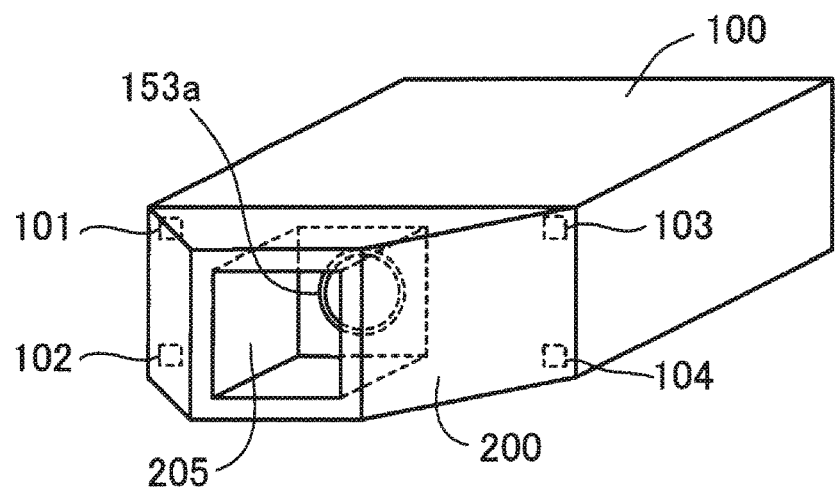
FIG. 3 shows the projector to which the enclosure member has been attached.

FIG. 3 shows an example of the projector 100 to which the enclosure member 200 has been attached. The enclosure member 200 encloses part of an area 400 (see FIG. 4), through which the image light projected via the projection lens 153a passes. The enclosure member 200 is provided with a pass-through port 205, through which the image light passes. The enclosure member 200 is freely attachable to and detachable from the projector 100.

It is conceivable that the projector 100 to which the enclosure member 200 has been attached is accidentally caused to collide with a wall or any other object and the enclosure member 200 comes off the projector 100. It is also conceivable that the user forgets to attach the enclosure member 200 to the projector 100.

In a situation in which the enclosure member 200 has not been attached to the projector 100 (see FIG. 1), the user can access the projection lens 153a and the high-intensity image light is more likely to enter the user's eyes than in the case where the enclosure member 200 has been attached to the projector 100 (see FIG. 3).

In view of the fact described above, the projector 100 adjusts the intensity of the image light in accordance with whether or not the enclosure member 200 has been attached to the projector 100. For example, in the case where the enclosure member 200 has not been attached to the projector 100, the projector 100 lowers the intensity of the image light as compared with the case where the enclosure member 200 has been attached to the projector 100.

The configuration of the projector 100 will next be described.

Figure 4:
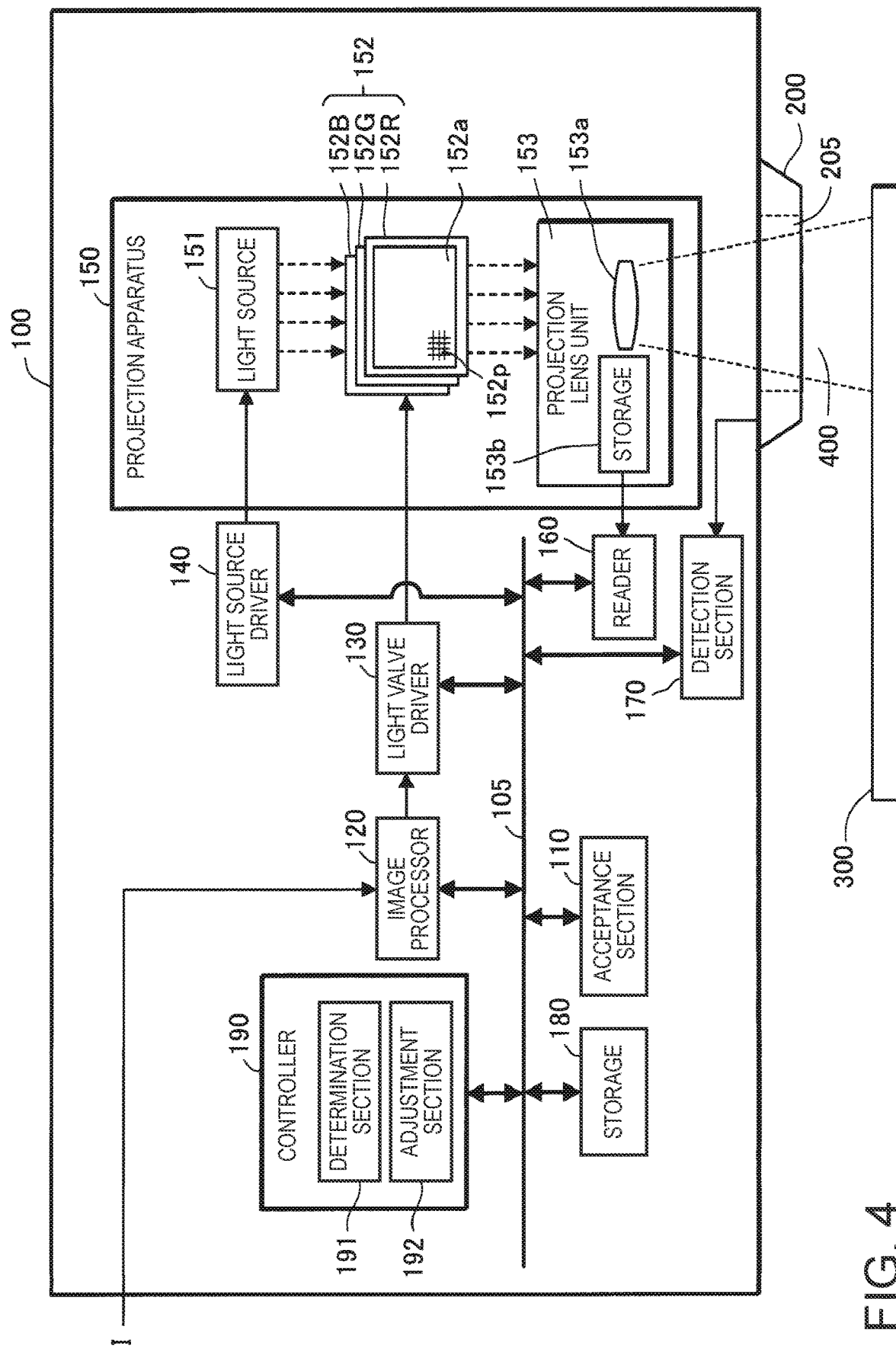
FIG. 4 diagrammatically shows the projector.

FIG. 4 diagrammatically shows the projector 100. The projector 100 includes a bus 105, an acceptance section 110, an image processor 120, a light valve driver 130, a light source driver 140, a projection apparatus 150, a reader 160, a detection section 170, a storage 180, and a controller 190.

The acceptance section 110, the image processor 120, the light valve driver 130, the light source driver 140, the reader 160, the detection section 170, the storage 180, and the controller 190 are communicable with each other via the bus 105.

The acceptance section 110 is, for example, a variety of operation buttons or operation keys or a touch panel. The acceptance section 110 accepts the user's input operation.

For example, the acceptance section 110 accepts operation of setting the luminance of an image. The operation of setting the luminance of an image sets the luminance expressed in percentage (luminance N %). N is a number greater than or equal to 0 but smaller than or equal to 100. The greater the value of N, the higher the luminance of an image, moreover, the intensity of the image light.

The acceptance section 110 may, for example, be a remote control that transmits information according to the user's input operation wirelessly or via a cable. In this case, the projector 100 includes a receiver that receives the information transmitted by the remote control. The remote control includes a variety of operation buttons or operation keys or a touch panel that accepts the user's input operation.

The image processor 120 performs image processing on image information to produce an image signal. For example, the image processor 120 performs image processing on image information I received from an image supplying apparatus, such as a PC, to produce an image signal.

The light valve driver 130 drives liquid crystal light valves 152 (152R, 152G, and 152B) in the projection apparatus 150 based on the image signal produced by the image processor 120.

The light source driver 140 drives a light source 151 in the projection apparatus 150. For example, when the acceptance section 110 accepts "power-on operation," the light source driver 140 causes the light source 151 to emit light.

The projection apparatus 150 projects the image light onto the projection surface 300 to display an image.

The projection apparatus 150 includes the light source 151, the three liquid crystal light valves 152 (152R, 152G, and 152B), and a projection lens unit 153.

The projection lens unit 153 is attachable to and detachable from the projector 100 and is exchangeable. The projection lens unit 153 includes the projection lens 153a and a storage 153b.

In the projection apparatus 150, the liquid crystal light valves 152 modulate the light emitted from the light source 151 to produce image light, and the projection lens 153a enlarges the image light and projects the enlarged image light onto the projection surface 300.

The light source 151 is a xenon lamp, an ultrahigh-pressure mercury lamp, a light emitting diode (LED), a laser light source, or any other light source. The light source 151 emits light. The light emitted from the light source 151 is an example of second light. The light emitted from the light source 151 passes through an optical integration system that is not shown, which reduces variation in the luminance distribution of the light, and the resultant light is then separated by a color separation system that is not shown into color light components of red (R), green (G), and blue (B), which are the three primary colors of light. The RGB color light components are incident on the liquid crystal light valves 152R, 152G, and 152B, respectively.

The liquid crystal light valves 152 are an example of a light modulation section that modulates the second light (light emitted by light source 151) in accordance with the image information to produce image light. In the present embodiment, the liquid crystal light valves 152 modulate the second light in accordance with the image signal according to the image information to produce image light. The liquid crystal light valves 152 are each formed, for example, of a liquid crystal panel in which a pair of transparent substrates encapsulate a liquid crystal material. A rectangular image area 152a, which is formed of a plurality of pixels 152p arranged in a matrix, is formed in each of the liquid crystal light valves 152. In each of the liquid crystal light valves 152, drive voltage is applicable to the liquid crystal material for each of the pixels 152p.

The light valve driver 130 applies drive voltage according to the image signal inputted from the image processor 120 to each of the pixels 152p, and the pixel 152p has optical transmittance set in accordance with the image signal. The light emitted from the light source 151 is therefore modulated when passing through the pixel areas 152a to form images according to the image signal on a color basis. The color images are combined with one another by a light combining system that is not shown on a pixel basis or for each of the pixels 152p into color image light.

The projection lens 153a enlarges the image light produced by the liquid crystal light valves 152 and projects the enlarged image light on the projection surface 300. The storage 153b stores a lens type ID, which is information representing the type of the projection lens 153a.

The reader 160 reads the lens type ID from the storage 153b. The lens type ID is sent to the controller 190.

The detection section 170 detects whether or not the enclosure member 200 has been attached to the projector 100. For example, in a case where a resistor provided in the enclosure member 200 (hereinafter referred to as "detection resistor") is electrically connected to the detection section 170 when the enclosure member 200 is attached to the projector 100, the detection section 170 operates as follows.

The detection section 170, when it detects the electric connection with the detection resistor, detects that the enclosure member 200 has been attached to the projector 100. On the other hand, the detection section 170, when it detects no electric connection with the detection resistor, detects that the enclosure member 200 has not been attached to the projector 100.

The detection section 170 may include a switch that is turned on when the protrusion 201 is inserted into the recess 101 (hereinafter also referred to as "detection switch"). In this case, the detection section 170 detects that the enclosure member 200 has been attached to the projector 100 when the state of the detection switch is the turned-on state. The detection section 170 detects that the enclosure member 200 has not been attached to the projector 100 when the state of the detection switch is in the turned-off state.

The detection switch may be replaced with a switch that is turned on when the protrusion 202 is inserted into the recess 102, a switch that is turned on when the protrusion 203 is inserted into the recess 103, or a switch that is turned on when the protrusion 204 is inserted into the recess 104. In this case, the detection section 170 detects whether or not the enclosure member 200 has been attached to the projector 100 in accordance with the turned-on and turned-off states of the switch provided in place of the detection switch.

The storage 180 is a computer readable recording medium. The storage 180 stores a program that specifies the action of the projector 100 and a variety of pieces of information.

The controller 190 is a computer, such as a central processing unit (CPU). The controller 190 may be formed of one or more processors. The controller 190 reads and executes the program stored in the storage 180 to achieve a determination section 191 and an adjustment section 192.

The determination section 191 uses the lens type ID read by the reader 160 to determine the type of the projection lens 153a.

The determination section 191 determines the type of the projection lens 153a to be a type classified based on the optical transmittance of the projection lens 153a (hereinafter simply referred to as "optical transmittance").

For example, in a case where the storage 180 stores lens information that relates the lens type ID to the optical transmittance of the projection lens identified by the lens type ID, the determination section 191 determines, as the type of the projection lens, the optical transmittance corresponding to the lens type ID. In the present embodiment, the storage 180 is assumed to store the lens information. To determine the optical transmittance of the projection lens 153a, the determination section 191 does not necessarily use the lens information, and the determination method can be changed as appropriate.

In the present embodiment, it is assumed that one of projection lenses A, B, and C is used as the projection lens 153a by exchanging the projection lens unit 153. The projection lens A is a reference lens. It is now assumed that the projection lens A (reference lens) has optical transmittance of 100%. In this case, it is assumed that the projection lens B has optical transmittance of 90% and projection lens C has optical transmittance of 50%. The projection lens A is an example of a first lens. The projection lens B is an example of a second lens having optical transmittance lower than the optical transmittance of the first lens. The values of the optical transmittance of the plurality of projection lenses are not limited to 100%, 90%, and 50% and can be changed as appropriate.

The adjustment section 192 adjusts the intensity of the image light based on the result of the detection performed by the detection section 170.

For example, in the case where the enclosure member 200 has not been attached to the projector 100, the adjustment section 192 lowers the intensity of the image light as compared with the intensity in the case where the enclosure member 200 has been attached to the projector 100.

In the present embodiment, in the situation in which the enclosure member 200 has not been attached to the projector 100, the adjustment section 192 adjusts the intensity of the image light projected via the projection lens 153a in such a way that the intensity of the image light is smaller than or equal to an upper limit restriction value of the intensity of the image light (hereinafter simply referred to as "upper limit restriction value").

It is assumed that there is a country where exposure of blue light having power higher than a certain value (upper limit restriction value) to a person is restricted. It is further assumed that the maximum intensity of the image light that the projector 100 can output via the projection lens 153a is greater than the upper limit restriction value.

In this case, the enclosure member 200 needs to be attached to the projector 100 to prevent the user from accessing the projection lens 153a. The image light having exited out of the projection lens 153a passes through the pass-through port 205 of the enclosure member 200, which lowers the intensity of the image light. The enclosure member 200 is so configured that the intensity of the image light having exited out of the enclosure member 200 is smaller than the upper limit restriction value.

On the other hand, in the case where the enclosure member 200 has not been attached to the projector 100, the projector 100 needs to lower the intensity of the image light that exits out of the projection lens 153a to a value smaller than or equal to the upper limit restriction value.

In the present embodiment, the upper limit restriction value is divided by the maximum intensity of the image light that the projector 100 can output via the projection lens 153a, and the quotient of the division of is used as a "restriction value." The restriction value is expressed in percentage. The restriction value is stored, for example, in the storage 180.

The adjustment section 192 controls the light source 151 based on the restriction value, the result of the detection performed by the detection section 170, the result of the determination performed by the determination section 191 (optical transmittance of projection lens 153a), and image luminance setting operation accepted by the acceptance section 110 (luminance N %) to adjust the maximum of the intensity of the light emitted by the light source 151 for adjustment of the intensity of the image light. The luminance N % of an image is also referred to as a "set value."

The result of the determination performed by the determination section 191 shows the optical transmittance of the projection lens 153a. The lower the optical transmittance of the projection lens 153a, the greater the amount of image light intensity attenuated by the projection lens 153a.

In the case where the enclosure member 200 has not been attached, the following Expression (1) needs to be satisfied.

$$\text{Restriction value} \geq \text{optical transmittance} \times \text{set value} \times \text{output adjustment information} \quad (1)$$

In Expression (1), the optical transmittance is an element for lowering the intensity of the image light. The intensity of the image light is reduced in accordance with the optical transmittance by the projection lens 153a.

In Expression (1), the set value (luminance N %) is another element for lowering the intensity of the image light. The intensity of the image light is reduced in accordance with the set value by controlling the light source 151.

In Expression (1), the output adjustment information is also an element for lowering the intensity of the image light. The output adjustment information is set to prevent the intensity of the image light having exited out of the projection lens 153a from exceeding the upper limit restriction value. The intensity of the image light is reduced in accordance with the output adjustment information by controlling the light source 151.

The adjustment section 192 uses Expression (2), which is a deformation of Expression (1), to calculate the output adjustment information.

$$\text{Output adjustment information} \leq \text{restriction value} / (\text{optical transmittance} \times \text{set value}) \quad (2)$$

For example, in a case where the restriction value is 70%, the enclosure member 200 has not been attached, the projection lens B having the optical transmittance of 90% is attached as the projection lens 153a, and the set value is the luminance of 90%, the adjustment section 192 calculates the output adjustment information at 86%. Specifically, the adjustment section 192 computes 70%/(90%×90%) to provide 86%.

In the situation in which the enclosure member 200 has not been attached, the adjustment section 192 then uses the following Expression (3) to calculate output information representing the maximum of the intensity of the light emitted by the light source 151.

$$\text{Output information} = (\text{output adjustment information} \times \text{set value}) \quad (3)$$

In a case where the output adjustment information exceeds 100%, the output information is greater than the set value, which does not meet the user's requirement for the intensity of an image. To avoid the situation described above, in the present embodiment, the upper limit of the output adjustment information is set at 100%. The upper limit of the output information is therefore the set value.

Examples of the case where the output adjustment information exceeds 100% may include a case where the optical transmittance is smaller than the restriction value and a case where the set value is smaller than the restriction value. The restriction value is an example of a first threshold and a second threshold.

On the other hand, in the case where the enclosure member 200 has been attached, the adjustment section 192 sets the set value as the output information. Therefore, in the case where the optical transmittance is smaller than the restriction value and the case where the set value is smaller than the restriction value, the adjustment section 192 makes adjustment in which the maximum of the intensity of the light emitted from the light source 151 in the case where the enclosure member 200 has not been attached to the projector 100 is made equal to the maximum of the intensity of the light emitted from the light source 151 in the case where the enclosure member 200 has been attached to the projector 100.

The adjustment section 192 controls the light source 151 in such a way that the intensity of the light emitted by the light source 151 is the maximum optical intensity indicated by the output information. The maximum of the intensity of the light emitted by the light source 151 specifies the maximum of the intensity of the image light.

The action of the projector 100 will next be described.

To simplify the description, the action in a case where the restriction value is 70% and the set value is luminance of 100% will be described below. The restriction value is assumed to be stored in the storage 180. The restriction value is not limited to 70% and is changed as appropriate in accordance with the contents of the restriction and other factors. The set value is also not limited to 100% and is changed as appropriate.

The acceptance section 110 accepts the luminance N % (N=100 in the example) from the user as a result of the operation of setting the luminance of an image, and the adjustment section 192 causes the storage 180 to store the luminance of 100% as the set value.

Figure 5:
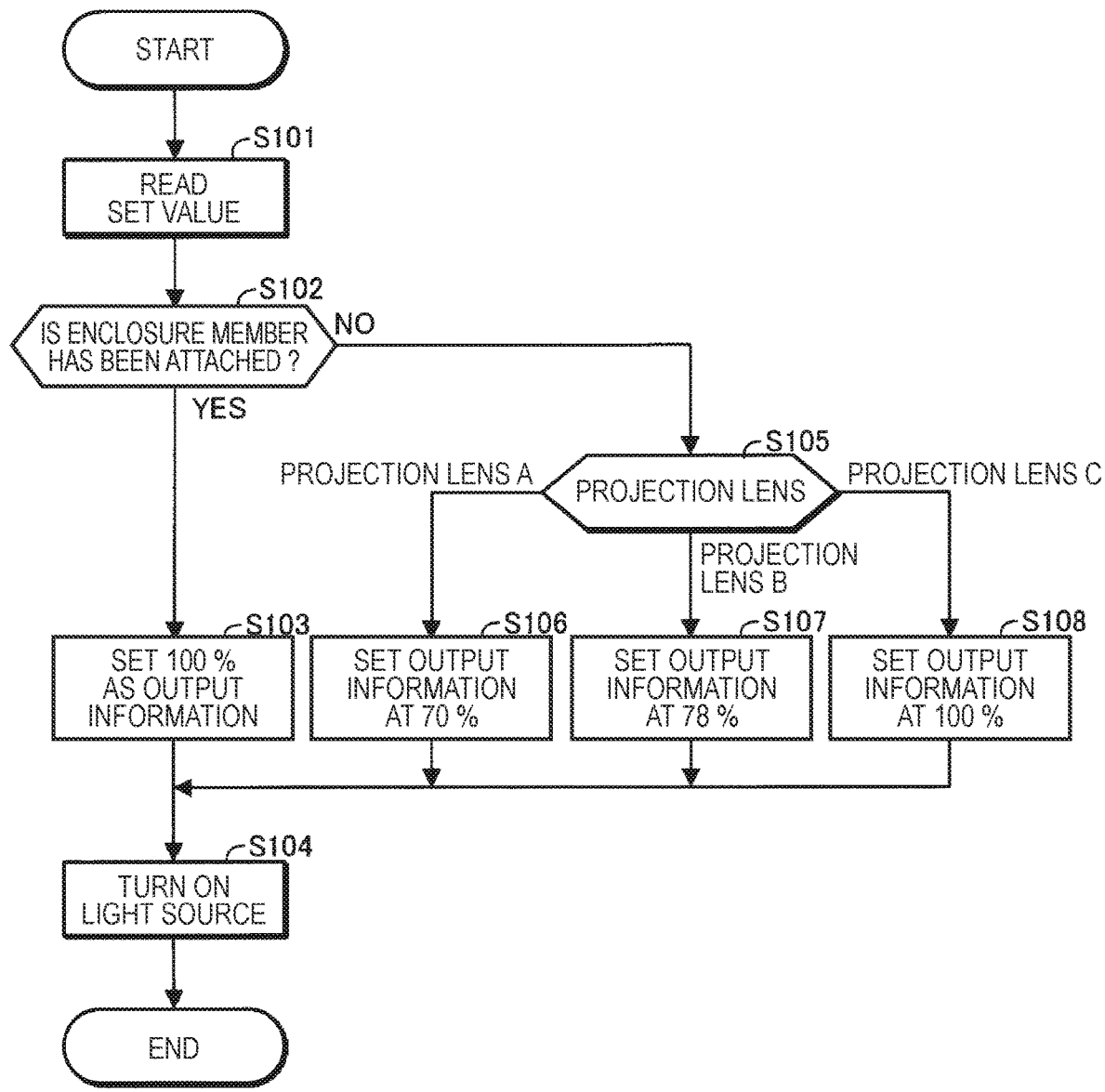
FIG. 5 is a flowchart for describing the action of adjusting the intensity of image light.

FIG. 5 is a flowchart for describing the action of adjusting the intensity of the image light. The action shown in FIG. 5 is repeatedly performed as long as the projector 100 is powered on.

The adjustment section 192 first reads the set value from the storage 180 (step S101).

The adjustment section 192 subsequently causes the detection section 170 to operate and acquires the result of the detection performed by the detection section 170, that is, the result of the detection representing whether or not the enclosure member 200 has been attached to the projector 100.

In the case where the enclosure member 200 has been attached to the projector 100 (YES in step S102), the adjustment section 192 sets 100% as the output information on the output from the light source 151 (step S103). The value 100% set as the output information is a value set in accordance with the set value (luminance of 100%). For example, when the set value is luminance M %, M % is set as the output information in step S103.

The adjustment section 192 subsequently uses the light source driver 140 to turn on the light source 151 with the output state indicated by the output information achieved (step S104). In the example, the light source 151 emits light having 100% of the maximum intensity of the light that the light source 151 can emit.

On the other hand, in the case where the enclosure member 200 has not been attached to the projector 100 (NO in step S102), the adjustment section 192 causes the reader 160 to operate. The reader 160 reads the lens type ID of the projection lens 153a and subsequently notifies the determination section 191 of the read lens type ID.

In a case where the lens type ID indicates the projection lens A (projection lens A in step S105), the determination section 191 refers to the lens information in the storage 180 and determines that the projection lens 153a has optical transmittance of 100%.

The adjustment section 192 subsequently calculates the output adjustment information by using Expression (2). In this case, the adjustment section 192 calculates the output adjustment information at 70% (70%=70%/(100%×100%)).

The adjustment section 192 subsequently calculates the output information by using Expression (3). In this case, the adjustment section 192 calculates the output information on the output from the light source 151 at 70% (70%=70%× 100%).

The adjustment section 192 subsequently sets the output information on the output from the light source 151 at 70% (step S106).

The adjustment section 192 subsequently carries out step S104. In this example, the light source 151 emits light having 70% of the maximum intensity of the light that the light source 151 can emit.

In a case where the lens type ID indicates the projection lens B (projection lens B in step S105), the determination section 191 determines that the optical transmittance is 90%.

The adjustment section 192 subsequently calculates the output adjustment information by using Expression (2). In this case, the adjustment section 192 calculates the output adjustment information at 78% (78%=70%/(90%×100%)).

The adjustment section 192 subsequently calculates the output information by using Expression (3). In this case, the adjustment section 192 calculates the output information on the output from the light source 151 at 78% (78%=78%× 100%).

The adjustment section 192 subsequently sets the output information on the output from the light source 151 at 78% (step S107).

The adjustment section 192 subsequently carries out step S104. In this example, the light source 151 emits light having 78% of the maximum intensity of the light that the light source 151 can emit.

In a case where the lens type ID indicates the projection lens C (projection lens C in step S105), the determination section 191 determines that the optical transmittance is 50%.

The adjustment section 192 subsequently calculates the output adjustment information by using Expression (2). In this case, since the value calculated by using Expression (2) (140%=70%/(50%×100%)) exceeds 100%, the adjustment section 192 determines that the output adjustment information is 100%.

The adjustment section 192 subsequently calculates the output information by using Expression (3). In this case, the adjustment section 192 calculates the output information on the output from the light source 151 at 100% (100%=100%×100%).

The adjustment section 192 subsequently sets the output information on the output from the light source 151 at 100% (step S108).

The adjustment section 192 subsequently carries out step S104. In this example, the light source 151 emits light having 100% of the maximum intensity of the light that the light source 151 can emit.

The projector 100 and the method for controlling the projector 100 according to the present embodiment adjust the intensity of the image light based on whether or not the enclosure member 200 has been attached to the projector 100. Therefore, for example, even when the enclosure member 200 has not been attached to the projector 100, the intensity of the image light can be lowered, whereby the user is unlikely to be affected by the image light.

Further, in the case where the enclosure member 200 has been attached to the projector 100, the intensity of the image light is not lowered in accordance with the restriction value, whereby the image light can be brighter than in the case where the enclosure member 200 has not been attached to the projector 100, and the user is unlikely to be affected by the image light.

Variations

The invention is not limited to the embodiment described above, and a variety of variations, for example, those that will next be described, are conceivable. Further, one or more variations arbitrarily selected from the following aspects of variations can be combined with one another as appropriate.

Variation 1

In the case where the enclosure member 200 has not been attached to the projector 100, the adjustment section 192 may adjust the intensity of the image light by inserting an optical system having optical transmittance lower than the restriction value in at least any of positions between the light source 151 and the liquid crystal light valves 152, between the liquid crystal light valves 152 and the projection lens 153a, and between the projection lens 153a and the projection surface 300. In this case, the adjustment section 192 may or may not carry out the process of adjusting the intensity of the light emitted from the light source 151.

Variation 2

In the case where the enclosure member 200 has not been attached to the projector 100, the adjustment section 192 may control the image processor 120 to adjust the intensity of the image light by lowering the luminance of an image indicated by the image information by a value corresponding to the restriction value. In this case, the adjustment section 192 may or may not carry out the process of adjusting the intensity of the light emitted from the light source 151.

Variation 3

The shape and configuration of the enclosure member 200 are not limited to the shape and configuration shown in FIG. 3 and can be changed as appropriate in accordance, for example, with the restriction.

For example, the enclosure member 200 may have a light transmissive member at the location where the pass-through port 205 is present.

Further, the enclosure member 200 may be formed of a light blocking member. In this case, the user can readily visually recognize the enclosure member 200 as compared with a case where the enclosure member 200 is formed of a light transmissive member. A situation in which the user accidentally causes the enclosure member 200 to collide with a wall or any other object so that the enclosure member 200 comes off the projector 100 can therefore be avoided.

Variation 4

In the case where the enclosure member 200 has not been attached to the projector 100, the adjustment section 192 may lower the intensity of the light emitted from the light source 151 to a fixed value smaller than the intensity in the case where the enclosure member 200 has been attached to the projector 100. In this case, the adjustment section 192 preferably uses the restriction value as the output information representing the fixed value.

Variation 5

The number of types of projection lens usable as the projection lens 153a is not limited to three and only needs to be at least one.

Variation 6

In a case where the projector 100 is used in a country where no restriction is imposed on the intensity of the image light, the adjustment made by the adjustment section 192 is likely to be unnecessary. Therefore, when the acceptance section 110 accepts operation indicating that no adjustment is required, the adjustment section 192 does not need to operate.

Variation 7

The aspect of the projector 100 may be a front-projection aspect in which the image light is projected on the projection surface 300 from the side facing the projection surface 300 or a rear-projection aspect in which the image light is projected on the rear surface of a transmissive projection surface 300.

Variation 8

The liquid crystal light valves 152 are used as the light modulating section, but the light modulating section is not limited to the liquid crystal light valves 152 and can be changed as appropriate. For example, the light modulating section may instead be configured to use three reflective liquid crystal panels. The light modulating section may still instead, for example, be configured to use one liquid crystal panel, three digital mirror devices (DMDs), or one digital mirror device. In the case where only one liquid crystal panel or DMD is used as the light modulating section, no members corresponding to the color separation system and the light combining system are required. Further, a configuration including no liquid crystal panel or DMD but capable of modulating the light emitted by the light source 151 can be employed as the light modulating section.

Variation 9

The entirety or part of the elements achieved when the controller 190 reads and executes the program may be achieved by hardware formed, for example, of a field programmable gate array (FPGA), an application specific IC (ASIC), or any other electronic circuit or may be achieved by software and hardware that cooperate with each other.

What is claimed is:

1. A projector comprising:
a projection lens that projects first light representing an image on a projection surface, the projection lens being provided in a surface of the projector;
a switch that detects whether or not an enclosure member that encloses part of an area through which the first light projected via the projection lens passes has been attached to the surface in which the projection lens is provided;
a light source that emits second light;
a light modulating section that modulates the second light in accordance with image information to produce the first light; and
a processor programmed to:
in a case where optical transmittance of the projection lens is less than a first threshold, make an adjustment in which a maximum intensity of the second light in a case where the enclosure member has not been attached is made equal to a maximum intensity of the second light in a case where the enclosure member has been attached, and
in a case where the optical transmittance of the projection lens is greater than the first threshold, make an adjustment in which the maximum intensity of the second light in the case where the enclosure member has not been attached is made lower than the maximum intensity of the second light in the case where the enclosure member has been attached.

2. The projector according to claim 1, wherein the processor is programmed to:
determine a type of the projection lens, and
adjust the maximum in the case where the enclosure member has not been attached based on a result of the determination performed by the determination section.

3. The projector according to claim 2, wherein in the situation in which the enclosure member has not been attached, and in a case where the projection lens is a second lens having optical transmittance lower than optical transmittance of a first lens, the processor is programmed to adjust the maximum to a value greater than the maximum in a case where the projection lens is the first lens.

4. The projector according to claim 1, further comprising:
an acceptance section that accepts operation of setting luminance of the image, wherein the processor is programmed to adjust the maximum based on the operation accepted by the acceptance section.

5. The projector according to claim 4, wherein in a case where the luminance set by the operation is less than a second threshold, the processor is programmed to make an adjustment in which the maximum in the case where the enclosure member has not been attached is made equal to the maximum in the case where the enclosure member has been attached.

6. The projector according to claim 1, wherein
the surface of the projector includes at least one recess, and the enclosure member includes at least one protrusion, and
the switch detects that the enclosure member is attached when the at least one recess and the at least one protrusion are engaged.

7. The projector according to claim 1, wherein
the surface of the projector includes at least one protrusion, and the enclosure member includes at least one recess, and
the switch detects that the enclosure member is attached when the at least one recess and the at least one protrusion are engaged.

8. A method for controlling a projector that projects, from a projection lens, first light representing an image on a projection surface, the projection lens being provided in a surface of the projector, the method comprising:
detecting whether or not an enclosure member that encloses part of an area through which the first light projected from the projector passes has been attached to the surface in which the projection lens is provided;
emitting second light;
modulating the second light in accordance with image information to produce the first light;
in a case where optical transmittance of the projection lens is less than a first threshold, making an adjustment in which a maximum intensity of the second light in a case where the enclosure member has not been attached is made equal to a maximum intensity of the second light in a case where the enclosure member has been attached; and
in a case where the optical transmittance of the projection lens is greater than the first threshold, making an adjustment in which the maximum intensity of the second light in the case where the enclosure member has not been attached is made lower than the maximum intensity of the second light in the case where the enclosure member has been attached.

* * * * *